Dec. 19, 1944.     S. BLOOMFIELD     2,365,380

STOP NUT

Filed Sept. 10, 1943

INVENTOR.
Samuel Bloomfield
BY
ATTORNEY.

Patented Dec. 19, 1944

2,365,380

UNITED STATES PATENT OFFICE 2,365,380

STOP NUT

Samuel Bloomfield, Wichita, Kans.

Application September 10, 1943, Serial No. 501,829

9 Claims. (Cl. 151—7)

This invention relates to self-affixing nuts for machine bolts or the like, conventionally designated in the trade as "stop nuts," and has for its primary object, the provision of a unit of that character that has as a component part thereof, a removable, rigid, fibrous element capable of having threads formed therein as the threaded body of the nut is moved to the operative position.

Another important aim of this invention is to provide a stop nut with a fibrous, renewable collar, capable of maintaining the nut body against accidental displacement after the threads are formed in said collar.

Other objects of the invention include the provision of a specially formed nut body, capable of holding a fibrous collar in the operative position, which collar has an anti-friction portion thereon, and detents cooperable with structure on said body to prevent relative movement of the body and collar as the assembly is manipulated to the operative location on the bolt.

A yet further aim of this invention is to provide a stop nut, the body whereof carries means for removably holding a fibrous collar, which collar may be renewed when the nut is free of the bolt with which it is designed to cooperate.

Specific structural details and the manner of associating the parts of the stop nut comprise further salient objects of the invention, all of which will appear during the course of the following specification, referring to the accompanying drawing, wherein.

Figure 1:
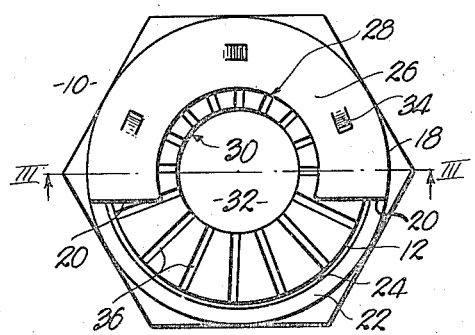
Fig. 1 is a top plan view of a stop nut made in accordance with the present invention.
Figure 4:
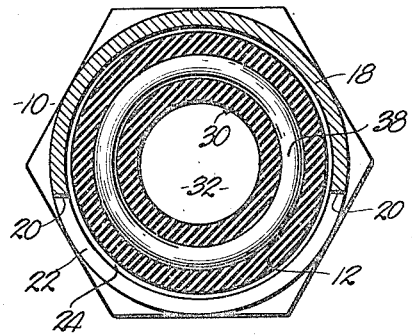
Fig. 4 is a sectional view through the stop nut taken on line IV—IV of Fig. 3, looking in the direction of the arrows.
Figure 2:
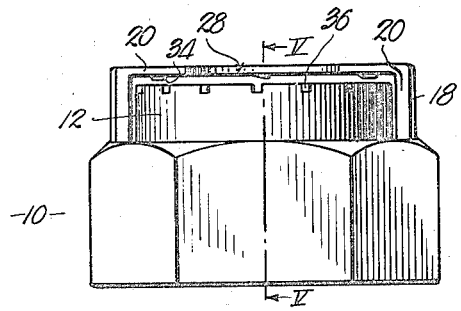
Fig. 2 is a side elevational view of the same.
Figure 5:
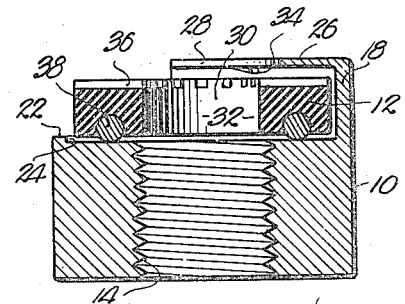
Fig. 5 is a sectional view taken on line V—V of Fig. 2, looking in the direction of the arrows.

It has heretofore been the practice to employ stop nuts having resilient inserts, the character whereof precludes replacement. The resilient insert is not placeable by the operator and the nuts, therefore, are replaceable only at relatively great expense.

The stop nut illustrated in the accompanying drawing may be used repeatedly merely by replacing the fibrous collar that is held in the operative position in an unique manner, permitting such replacement by the mechanic.

The body 10 of the nut has an outer periphery of conventional contour, sofar as the ring-engaging outer surface thereof is concerned. The hexagonal form of nut illustrated, is in common use but it is understood that any form of nut body may be made to support the hereinafter more fully described fibrous collar 12.

Body 10 of the nut has a threaded opening 14 therethrough to receive a conventional bolt 16. A skirt 18 of semi-circular character partially circumscribes threaded opening 14 and projects laterally from one end of body 10.

Skirt 18 terminates at faces 20 spaced apart a distance very slightly less than the outside diameter of collar 12. The inside diameter of skirt 18 is slightly greater than the outside diameter of collar 12, but the distance between faces 20 is less than the outside diameter of 12, and therefore, when said collar is moved to position between faces 20, slight pressure is all that is needed, after which the collar will remain in place.

A bead 22 interconnects faces 20 and cooperates with skirt 18 in establishing a shallow cavity 24 in one end of body 10 to receive collar 12. Skirt 18 and bead 22 form a circular wall concentric with the outer annular face of collar 12, and after said collar 12 is moved to the operative position, flange 26 will overhang a portion thereof, as indicated in the drawing.

Flange 26 is commensurate in length with skirt 18 and projects radially inwardly therefrom to an arcuate face 28 spaced outwardly from the inner face 30 of collar 12, which forms opening 32 through this fibrous element of the assembly.

A plurality of detents 34 formed in flange 26 may be stamped or otherwise created to engage cooperating openings 36 of any desirable form provided on the face of collar 12. The opposite face of collar 12 carries an annulus 38 in the nature of a wire ring to establish a frictionless line contact between collar 12 and the face of nut body 10 at the bottom of cavity 24. This line contact circumscribes threaded opening 14 and is substantially concentric with the axis of the entire assembly.

The space between the innermost part of detents 34 and this said face of body 10 at the bottom of cavity 24, is very slightly greater than the thickness of collar 12 from line contact of annulus 38 to the outermost face of the collar wherein are formed the plurality of openings 36. Thus, it is possible to introduce collar 12 to the operative position within the confines of skirt 18 and below flange 26 where, as bolt 16 is forced through opening 32 to cut threads in the collar, the bolt forces collar 12 into contact with the detents 34 and relative displacement of body and collar 10 and 12 respectively cannot occur. This is due to the inter-engagement between detents 34 and openings 36.

Figure 6:
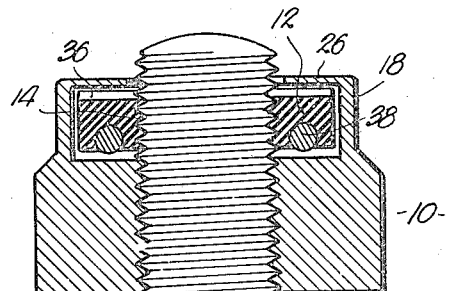
Fig. 6 is a view similar to Fig. 3, but with the stop nut forced to a place on the conventional bolt where threads have been cut in the fibrous collar.

As threads are being cut in the rigid, fibrous material from which collar 12 is made, collar 12 will assume the position shown in Fig. 6, but in the event body 10 of the nut attempts to move from its desired position on bolt 16, annulus 38 will engage the face of nut 10 to oppose such action.

When the assembly, illustrated and described above, is removed from bolt 16, a new collar 12 may be placed upon removal of the used collar without destroying in anywise the effectiveness of nut body 10. When the assembly is removed from a bolt, collar 12 is destroyed without effecting the threads in opening 14 of body 10.

Figure 7:
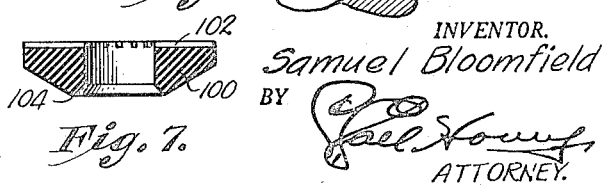
Fig. 7 is a cross sectional view through a fibrous collar made in accordance with a modified form of the invention.

Another form of collar that may be employed is illustrated in Fig. 7. This modified form of collar 100 includes the openings 102 but in lieu of annulus 38 to establish the line contact, the inner face of collar 100 is formed to present the fine line of contact at edge 104. The material from which collar 100 is produced should be rigid, fibrous substance, the same as used in making collar 12, for this material is capable of having threads cut therein by a bolt such as 16, yet strong enough to create the desired amount of friction between the faces of the threads on bolt 16 and on body 10 to preclude accidental displacement.

Figure 3:
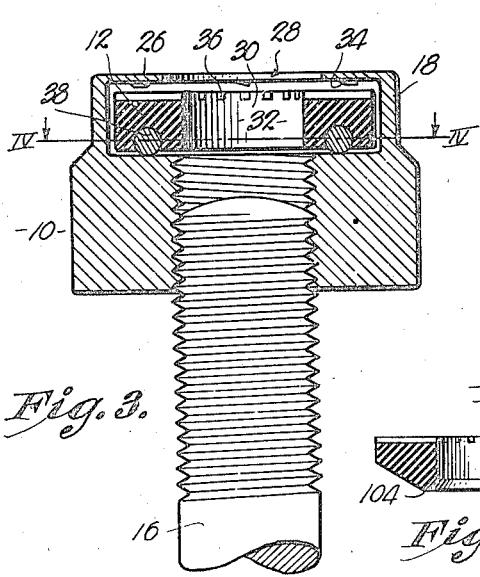
Fig. 3 is a transverse cross sectional view through the stop nut, showing the same in combination with a conventional bolt.

In using applicant's device an insert 12 is forcibly inserted through the entrance between face 20 into the cavity in nut 10 and when so inserted 12 lies loosely on the bottom of said cavity and loosely therein with its bore 30 substantially in line with 14 of nut 10. A bolt 16 is now screwed into 10 as shown in Fig. 3 and easily enters 14 until it encounters the bore in 12. When 16 encounters 12 the same is raised thereby so that detents 34 and opening 36 interengage and further relative rotation between 12 and 10 ceases and 16 impresses its threads into 12 and there is great frictional grip of 12 on 16. If now 10 starts to unscrew the nut 10 comes into contact with 38 or 104 and since these present little friction on 10, the insert 12 is not unscrewed by the retrograde movement of 10 and 12, thus locking the nut 10 to the bolt.

Having thus described the invention, what is claimed as new and desired to be secured by Letters Patent is:

1. A stop nut comprising a body having a threaded opening therethrough; an axially projecting skirt on the body; and a fibrous collar removably carried by the skirt, said skirt having an entrance opening for the collar in radial relation to the axis of the nut.

2. A stop nut comprising a body having a threaded opening therethrough; an axially projecting skirt on the body; a fibrous collar carried by the skirt; and detents formed on the collar and body to prevent relative rotation of the body and collar when the nut is being moved to position on a bolt, said skirt having a portion thereof cut away to form a side entrance for the collar and a shallow cavity within said skirt to retain said collar.

3. A stop nut comprising a body having a threaded opening therethrough; an axially projecting skirt on the body; an overhanging flange on the skirt; a fibrous collar carried by the skirt; and detents formed on the collar and flange to prevent relative rotation of the body and collar when the nut is being moved to position on a bolt, said skirt being formed to permit removal of the collar from the operative position when the nut is disengaged from the bolt.

4. A stop nut comprising a body having a threaded opening therethrough; a chamber formed in the body; a fiber collar in the chamber having a smooth inner annular surface substantially the same diameter as the crest diameter of the threads in said threaded opening said chamber having a side opening for entrance of the collar into the chamber, the width of said opening being slightly less than the width of the collar to require a small amount of pressure for forcing the collar into said chamber; and means for preventing relative movement of the body and said collar as the nut is moved to position on a bolt.

5. A stop nut for bolts of conventional character comprising a body having a threaded opening therethrough; and a fibrous collar removably mounted on the body, the inside face of the collar being smooth, concentric with the inside threaded face of the opening of the nut body and substantially the same diameter as the crest diameter of said threaded opening; and an annulus partly embedded in said inside face of the collar to provide an anti-friction face for engagement with the proximal face of the body.

6. A stop nut for bolts of conventional character comprising a body having a threaded opening therethrough; a fibrous collar removably mounted on the body, the inside face of the collar being smooth, concentric with the inside threaded face of the opening of the nut body and substantially the same diameter as the crest diameter of said threaded opening, said body having an overhanging flange provided with detents; and radial grooves in the collar for engaging said detents to prevent relative movement of the body and collar about the axis of the nut.

7. A stop nut for bolts of conventional character comprising a body having a threaded opening therethrough; a fibrous collar removably mounted on the body, the inside face of the collar being smooth, concentric with the inside threaded face of the opening of the nut body and substantially the same crest diameter of said diameter of the threaded opening; detents on the body and collar preventing relative movement thereof about the axis of the nut; and structure on the collar presenting a line contact between the collar and body, said line contact being in circumscribing relation with the openings of the body and collar and concentric with the axes thereof.

8. A stop nut for bolts of conventional character, comprising a body having a threaded opening therethrough; a recess formed in the body and circumscribing the opening at one side of the body; a collar of rigid fibrous material confined within the recess with the inside wall thereof substantially in alignment with the inner edges of the threads of the body opening; detents on the body and said collar to prevent relative movement of the body and collar about the axis of the bolt when the body is being moved to the operative position and as threads are being cut in the inner face of the collar; and an anti-friction face of small area on the collar and in engagement with the proximal face of the body.

9. A stop nut comprising a body having a threaded opening therethrough; an axially projecting skirt on the body; and a fibrous collar removably carried by the skirt, said skirt having an entrance opening for the collar in radial relation to the axis of the nut, said opening being smaller in width than the diameter of the collar which passes therethrough whereby slight pressure is required to insert the collar which is then retained in the opening.

SAMUEL BLOOMFIELD.